United States Patent Office.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

BLUE DYE.

SPECIFICATION forming part of Letters Patent No. 580,186, dated April 6, 1897.

Application filed January 14, 1897. Serial No. 619,217. (Specimens.)

*To all whom it may concern:*

Be it known that I, ALBERT HERRMANN, doctor of philosophy, a citizen of the Empire of Germany, residing at Höchst-on-the-Main, in the Empire of Germany, have invented a new and useful Improvement in the Manufacture of Blue Acid Dyestuffs, of which the following is a specification.

The blue acid dyestuff described below is obtained by the condensation of monobenzyl-orthotoluidin monosulfonic acid with tetraalkyldiamidobenzhydrol and by the oxidation of the leuco compound thus obtained. It is therefore the sulfonic acid of tetraälkylbenzyltriamidodiphenyl-orthotolylcarbinol, having the following formula:

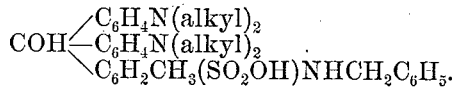

Twenty-seven kilograms of tetramethyldiamidobenzhydrol or the equivalent quantity of tetraethyldiamidobenzhydrol are dissolved in thirty-five kilograms of hydrochloric acid and two hundred liters of water. To this solution are added 29.7 kilograms of the calcium salt of monobenzyl-orthotoluidin monosulfonic acid in fifty liters of water and heated for from eight to ten hours on the water-bath till disappearance of the hydrol. The product of the reaction is made alkaline with soda, filtered off from the separated calcium carbonate, salted out from the filtrate of the leuco salt, and dried.

Ten kilograms of the leuco compound, being the sulfonic acid of tetraälkylbenzyltriamidodiphenyl-orthotolylmethan, are dissolved in three hundred liters of water, the solution heated to 70° centigrade, thoroughly stirred with the calculated quantity of acetic acid and lead peroxid, and then six kilograms of Glauber's salt are added to precipitate the lead, after which the dyestuff is filtered off. The dyestuff is salted out from the filtrate or the solution is evaporated.

The new dyestuff forms a copper-red powder of metallic luster. It is easily soluble in water with a blue color, but somewhat less soluble in alcohol.

The solution of the dyestuff turns green on addition of mineral acids, but does not change color with ammonia or soda. On boiling with soda-lye it turns violet.

The dyestuff dyes wool and silk in an acid-bath an even blue, the tints being characterized by their great fastness to soap, water, air, and light.

Having thus described my invention, I claim as new and desire to secure by Letters Patent—

1. The process herein described of producing a blue dyestuff, which consists in condensing tetraälkyldiamidobenzhydrol with monobenzyl-orthotoluidin monosulfonic acid, and then oxidizing the thus-obtained sulfonic acid of tetraälkylbenzyltriamidodiphenyl-orthotolylmethan, substantially as set forth.

2. As a new product, the blue dyestuff, namely the monosulfonic acid of tetraälkyl-monobenzyltriamidodiphenyl-orthotolylcarbinol, being a copper-colored powder of metallic luster, easily soluble in water, less easily in alcohol, its aqueous solution turning green with mineral acids, but not changing its color with ammonia or soda, turning violet on boiling with soda-lye, and dyeing wool and silk a very even and fast blue in an acid-bath, substantially as set forth.

In testimony that I claim the foregoing as my invention I have signed my name in presence of two subscribing witnesses.

ALBERT HERRMANN.

Witnesses:
 HEINRICH HAHN,
 ALFRED BRISBOIS.